(12) United States Patent
Heatley

(10) Patent No.: US 7,164,936 B2
(45) Date of Patent: Jan. 16, 2007

(54) METHOD AND COMMUNICATION NETWORK FOR CONTROLLING THE MENU FUNCTION OF A MOBILE TELEPHONE

(75) Inventor: David J T Heatley, Felixstowe (GB)

(73) Assignee: British Telecommunications public limited company, London (GB)

( * ) Notice: Subject to any disclaimer, the term of this patent is extended or adjusted under 35 U.S.C. 154(b) by 459 days.

(21) Appl. No.: 10/221,317

(22) PCT Filed: Mar. 28, 2001

(86) PCT No.: PCT/GB01/01386

§ 371 (c)(1),
(2), (4) Date: Sep. 11, 2002

(87) PCT Pub. No.: WO01/76299

PCT Pub. Date: Oct. 11, 2001

(65) Prior Publication Data

US 2003/0050096 A1 Mar. 13, 2003

(30) Foreign Application Priority Data

Mar. 31, 2000 (EP) ............................ 00302759

(51) Int. Cl.
*H04B 1/38* (2006.01)

(52) U.S. Cl. .................. 455/566; 455/412.1; 455/415; 379/88.11

(58) Field of Classification Search ................ 455/566, 455/412.1, 412.2, 414.1, 415, 466; 379/88.11, 379/88.12, 88.19, 88.2, 88.21, 88.1
See application file for complete search history.

(56) References Cited

U.S. PATENT DOCUMENTS

| 5,327,486 | A | 7/1994 | Wolff et al. |
| 5,818,920 | A | 10/1998 | Rignell et al. |
| 6,169,911 | B1 * | 1/2001 | Wagner et al. ............... 455/566 |
| 6,404,874 | B1 * | 6/2002 | Chestnut ................. 379/211.02 |
| 6,714,793 | B1 * | 3/2004 | Carey et al. ................. 455/466 |

* cited by examiner

*Primary Examiner*—Lee Nguyen
(74) *Attorney, Agent, or Firm*—Nixon & Vanderhye, P.C.

(57) ABSTRACT

If a mobile telephone has sent a restricted delivery mode message to the network, also referred to as "Message Mode", the mobile network sets a "Message Mode" flag in the user's profile. For an originating call the profile is accessed in the normal manner, and, if that flag is set, the network sends a "Message Only—Leave Message" announcement to the caller, together with a command signal to switch the caller's telephone into Write Messages mode so that the calling user can immediately enter a text message via the keypad without having to select manually the Write Messages function from the Messages function of the menu.

23 Claims, 3 Drawing Sheets

METHOD AND COMMUNICATION NETWORK FOR CONTROLLING THE MENU FUNCTION OF A MOBILE TELEPHONE

This application is the US national phase of international application PCT/GB01/01386 filed 28 Mar. 2001 which designated the U.S.

TECHNICAL FIELD

The present invention relates to communications methods and apparatus, and particularly, but not exclusively, to methods of operating mobile communications networks and to mobile telephones for use with mobile communications networks, and more particularly to remote selection of a menu function of such mobile telephones.

BRIEF SUMMARY OF NON-LIMITING EMBODIMENTS

In accordance with a first aspect of the present invention there is provided a method of operating a communications network having a user profile store, the method comprising the steps of:

retrieving a dialled destination number from signalling data of a call from a calling user to a called user;

accessing the user profile store in accordance with that retrieved dialled destination number to retrieve a corresponding user profile; and if the retrieved user profile contains a predetermined indication indicative of a corresponding condition associated with that called user, sending to the calling user a command for causing a telephone associated with the calling user to enter a predetermined menu function associated with that condition.

An advantage of the present invention is that the network anticipates the calling user's most likely next action and commands the telephone to enter a corresponding menu function, without requiring any input, e.g. key presses, by the calling user. This simplifies and minimises the actions required of the user.

The present invention is particularly beneficial in mobile networks, wherein users' mobile telephones have a menu system which is navigated by key presses.

Preferably, said condition is that a telephone associated with that called user has sent a restricted delivery mode message to the network, and said predetermined menu function is a write messages function.

More preferably, there is included the step of receiving at the network from that calling user message data in text form, and in response sending a message to the called user.

Preferably, said condition is that the called user is currently associated with a network number that is different from the network number that he was previously associated with, and the command contains the called user's current network number and also causes the telephone associated with the calling user to display that current network number, and said predetermined menu function is a telephone directory function.

More preferably, when the call from the calling user is made by selecting an entry from the telephone directory, said predetermined menu function is an edit function of the telephone directory function.

When the call from the calling user is made by entering the destination number via a keypad, said predetermined menu function is an add entry function of the telephone directory function.

Preferably, the network also sends to the telephone associated with the calling user data indicative of the name of the called user for use by the calling user in adding an entry to the telephone directory.

Preferably, the network sends the name of the called user in said command.

Alternatively, the network may send the name of the called user in a separate command in response to an acceptance signal sent from the telephone associated with the calling user and indicating that the calling user had activated the add entry function.

The command may be generated in accordance with menu structure data retrieved from storage in accordance with a calling line identity retrieved from said signalling data.

Preferably, the user profiles may contain an identifier for telephone equipment currently registered to the user, and said menu structure data may be retrieved from a mapping of menu structure data against equipment identifier by accessing that mapping in accordance with an identifier retrieved from the calling user's profile.

Preferably, the command comprises a number sequence corresponding to a menu shortcut for said predetermined menu function.

In accordance with a second aspect of the present invention there is provided a communications network having a user profile store, and being arranged:

to retrieve a dialled destination number from signalling data of a call from a calling user to a called user;

to access the user profile store in accordance with that retrieved dialled destination number to retrieve a corresponding user profile; and if the retrieved user profile contains a predetermined indication indicative of a corresponding condition associated with that called user, to send to the calling user a command for causing a telephone associated with the calling user to enter a predetermined menu function associated with that condition.

Preferably, the network is arranged to respond to a said predetermined indication indicative that a telephone associated with that called user has sent a restricted delivery mode message to the network by generating said command such as to cause the telephone associated with the calling user to enter a write messages function.

More preferably, the network is arranged to receive from that calling user message data in text form, and to respond by sending a message to the called user.

Alternatively, the network is arranged to respond to a said predetermined indication indicative of the dialled destination number being a non-current destination number associated with that called user to generate said command such as to include the called user's current destination number and also such as to cause the telephone associated with the calling user to enter a telephone directory function and to display that current destination number.

Preferably, the network is further arranged to send to the calling user the name of the called user for use by the calling user in adding an entry to the telephone directory.

The network may be further arranged to send the name of the called user by including it in said command.

The network may be further arranged to respond to receipt of an acceptance signal sent from the telephone associated with the calling user and indicating that the calling user had activated an add entry function to send the name of the called user in a separate command.

The network may be arranged to generate said command in accordance with menu structure data retrieved from storage in accordance with a calling line identity retrieved from said signalling data.

The network may comprise a mapping of menu structure data against equipment identifier, and have user profiles containing an identifier for telephone equipment currently registered to the user, and be arranged to retrieve menu structure data by accessing that mapping in accordance with an identifier retrieved from the calling user's profile.

The network may be arranged to include in said command a number sequence corresponding to a menu shortcut for said predetermined menu function.

Specific embodiments of a mobile communications network and of a mobile telephone for use with that network will now be described by way of example with reference to the drawings in which:

DETAILED DESCRIPTION OF NON-LIMITING EXEMPLARY EMBODIMENTS

Figure 1:
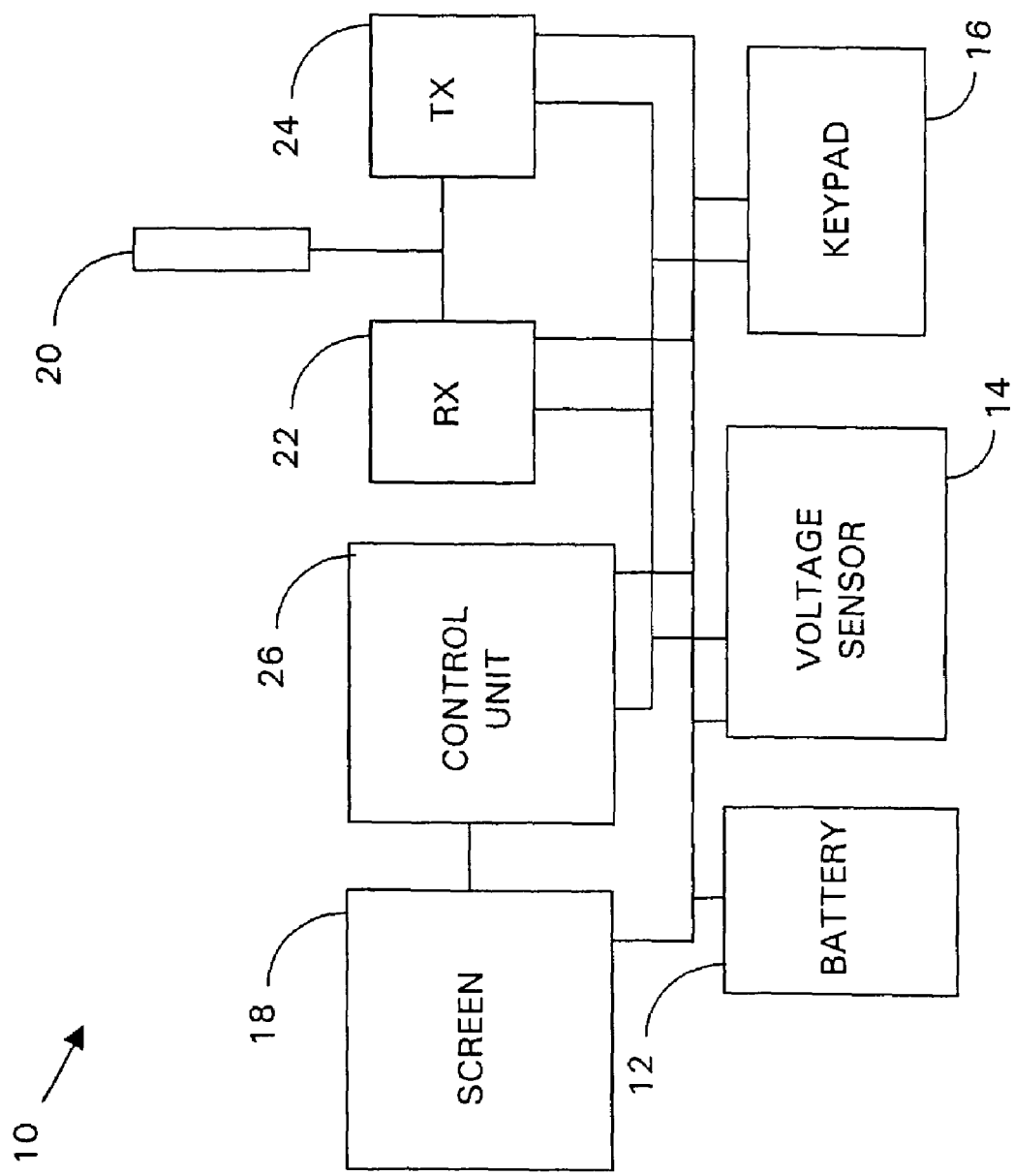
FIG. 1 is a schematic diagram of a mobile telephone in accordance with the present invention.

In this description the following acronyms are used:
BSS—Base Switching Subsystem
CLI—Calling Line Indication, also known as Calling Line Identity,
GPRS—General Packet Radio Service
GSM—Global System for Mobile Communications (Groupe Speciale Mobile)
HLR—Home Location Register
IVR—Interactive Voice Response
LCD—Liquid Crystal Display
MSS—Mobile Switching Subsystem
NSS—Network Switching Subsystem
OSS—Network Switching Subsystem
SMS—Short Message System
VLR—Visitor Location Register In FIG. 1 there is shown a mobile telephone 10 of the present invention having components including a battery 12, a battery voltage sensing circuit 14, a keypad 16, an LCD screen 18, an aerial 20, a receive circuit 22, a transmit circuit 24 and a control unit 26.

The control unit 26 is arranged to receive inputs from the keypad 16, the sensing circuit 14, and the receive circuit 22, and to provide outputs to the screen 18 and the transmit circuit 24. It is arranged to provide mobile telephony functions as is known in the art, such as sending and receiving calls and messages, and managing a menu, including a telephone directory, also known as a phone book, and is further arranged in accordance with the present invention to provide additional functions as described below.

The control unit 26 is arranged to respond to receipt via the receive circuit 22 of various command signals from a host GSM network (FIG. 2) to enter its menu system and activate particular submenu functions, thereby enabling a user to make keyboard entries for those submenu functions without any manual selection procedure. As used herein, the terms "command signal" and "command" are equivalent.

As is known in the art, a typical menu system comprises the main menu functions: Phone Book; Messages; Call Register; Settings; Call Divert; Games; Calculator; Clock and Tones. Each main menu function has a plurality of submenu functions. For example, Phone Book includes the submenu functions Search; Add Entry; Erase; Edit; etc.: Messages includes the submenu functions Inbox; Outbox; Write Messages; etc: and Call Register includes the submenu functions Missed Calls; Received Calls; Dialled Calls; etc. Some of the submenu functions themselves have submenu functions.

Figure 2:
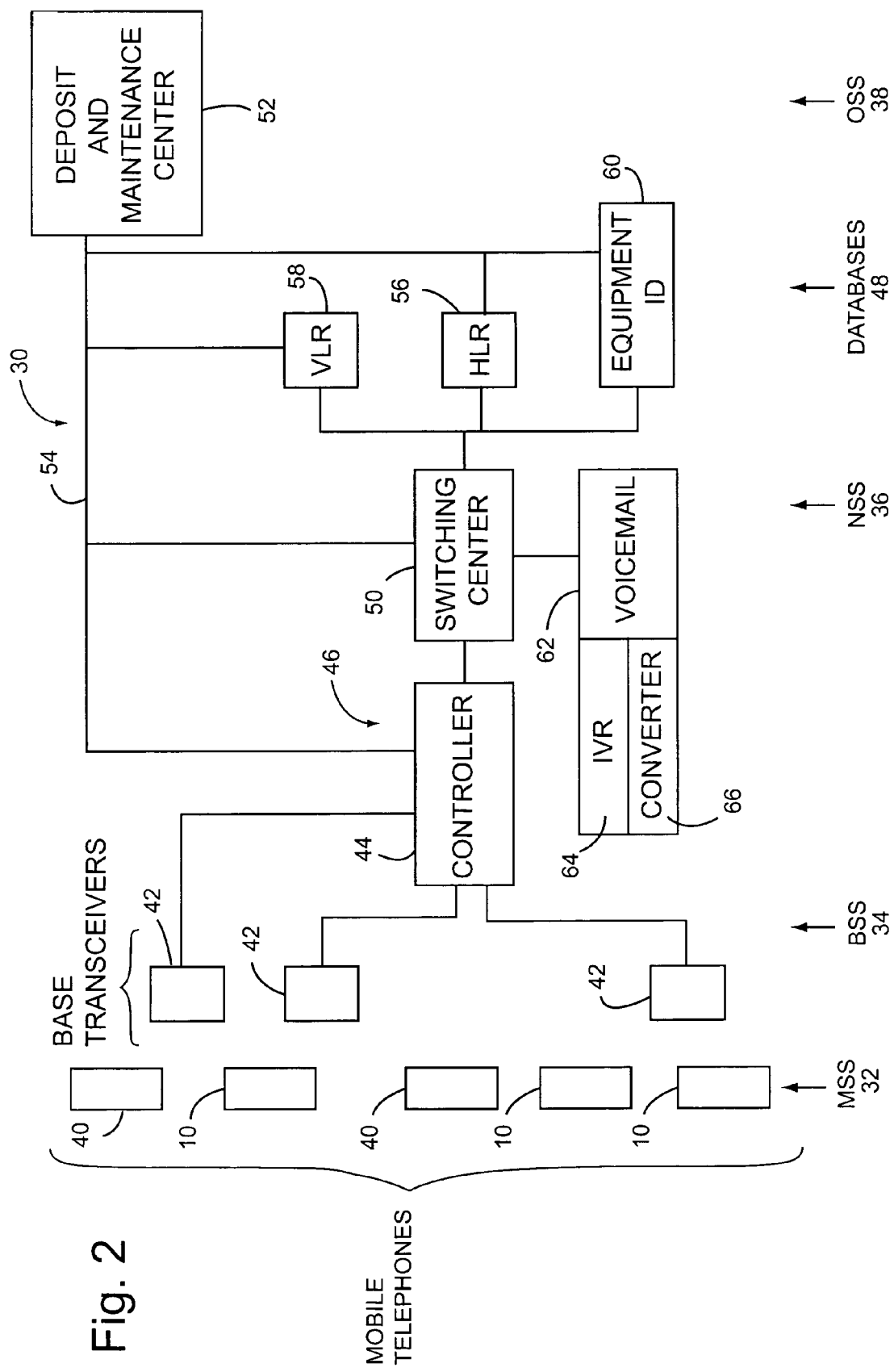
FIG. 2 is a schematic diagram of a mobile communications network for use with the mobile telephone of FIG. 1.

Before example scenarios are described, it is appropriate to describe first the GSM network of FIG. 2.

In FIG. 2, there is shown a GSM network 30 constituted by four subsystems, namely, Mobile Station Subsystem (MSS) 32, Base Station Subsystem (BSS) 34, Network and Switching Subsystem (NSS) 36 and Operation Subsystem (OSS) 38. Global communications is achieved by interconnection of spaced apart national-based GSM networks operated by different respective network operators.

The GSM system is well known to the skilled person in the art and is described below only in high-level detail. However, should any reader require more information, he will find a number of publications on GSM, particularly, "The GSM System for Mobile Communications" by M. Mouly and M.-B. Pautet, ISBN 2-9507190-0-7, published 1992 by the authors thereof.

The MSS 32 comprises a plurality of the mobile telephones 10, and, until 100% penetration of the mobile telephone market by mobile telephones 10, there will be a plurality of conventional mobile telephones 40, i.e. those not having the additional feature of the present invention.

The BSS 34 comprises a plurality of base transceiver stations 42 and a plurality of base station controllers 44, only one which is shown. Each of the base station controllers 44 is connected to the NSS 36 and to a plurality of the base transceiver stations 42.

The NSS 36 comprises an exchange system 46 and user and terminal equipment databases 48. The exchange system 46 comprises a plurality of interconnected mobile services switching centres 50, only one which is shown, which are connected to the user and terminal equipment databases 48.

The OSS 38 comprises an operation and maintenance centre 52 which is connected, via a data network 54, to the BSS 34 and the NSS 36.

The user and terminal equipment databases 58 comprise a home location register (HLR) 56, a visitor location register (VLR) 58 and an equipment identity register 60.

A Voicemail system 62 is connected to the exchange system 46 and includes an interactive voice response facility (IVR) 64 capable of generating selected announcements, and a speech to text converter 66.

Figure 3:
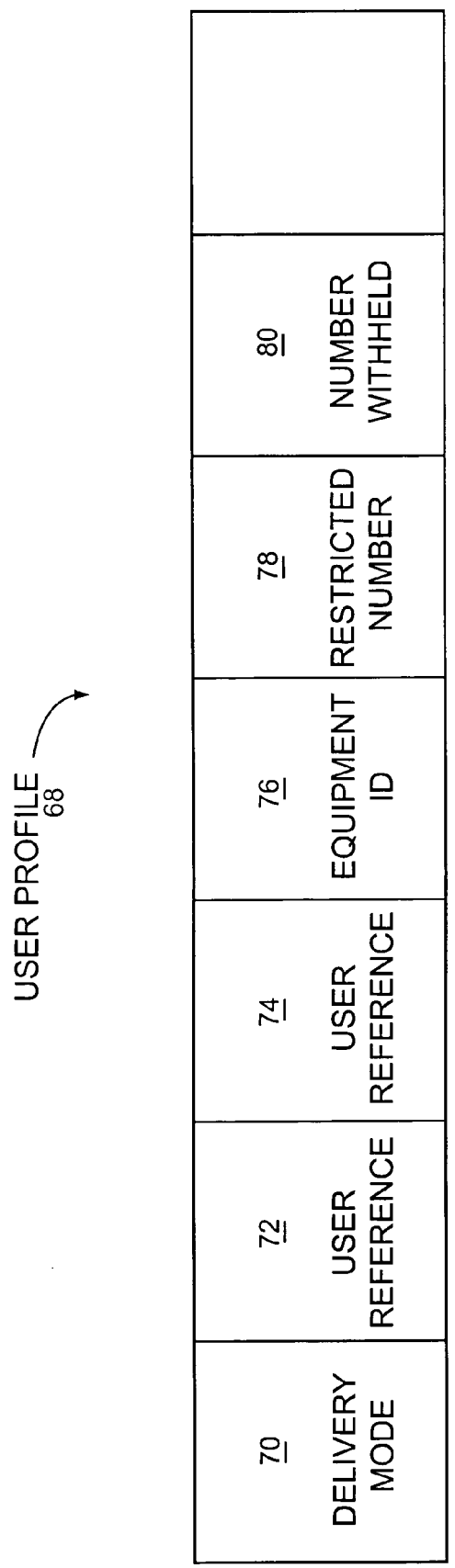
FIG. 3 is a schematic diagram of a user profile for use in the communications network of FIG. 2.

The HLR 56 is a database which stores user profiles 68 (FIG. 3), which contain user-specific information relevant to the provision of telecommunications services and identifying whether a given teleservice or bearer service can be provided for a user, and also containing user preferences defining how the user wishes the network to handle calls.

The VLR 58 temporarily stores subscription data for users who are normally registered with a different home GSM network and who are currently registered with the GSM network 30, i.e. under a roaming arrangement.

The user profiles 68 include a Delivery Mode field 70 containing a flag which, when set, is indicative that the GSM network had received from a mobile telephone 10 associated with the corresponding user a message addressed to a predetermined destination address and containing a unique code for notifying that network that the delivery mode for calls to that called user is to be "Message Only" mode, also referred to as restricted delivery mode. That notification message is sent either automatically by the mobile telephone when it enters low battery condition, or when the user has selected Message Only mode, e.g. from the menu. If the Delivery Mode flag is not set, the delivery mode is referred to as unrestricted delivery mode.

A mobile telephone which can send such a notification message when it enters low battery condition, and a variant mobile telephone which, when it enters low battery condition, can switch automatically, or be manually switched, between full and simplex operation, are disclosed in our co-pending European patent application number 00302738.0, filed on 31st March 2000. It is not part of the present invention and will not be described further. It is sufficient for the purposes of the present invention to understand that a user profile 68 can be interrogated in the usual manner to ascertain how a call for that user should be processed, and that retrieval of the state of the Delivery Mode flag (field 70) is just one of the retrievable data items. The user profile 68 employed by the GSM network 30 has a universal user profile configuration. In other words, some profile fields are not relevant to certain types of mobile telephone, and in such a case the flags in those fields will be permanently in their reset state. In variants, the network is arranged to work with two or more types of user profiles, e.g. one type of profile will not have a Delivery Mode field 70, whilst another type of profile will have such a Delivery Mode field 70. Herein, the flag contained in the Delivery Mode field 70 is also referred to as the Delivery Mode flag.

The NSS 36 is arranged to respond to an incoming call having the above mentioned predetermined destination address by retrieving the message content of that incoming call. Upon recognising the retrieved message as the above mentioned unique code representative of the "Message Only" mode, the NSS 36 accesses the user profiles 68 in accordance with a source telephone number (calling line identity) retrieved from the incoming call, finds the corresponding user profile and changes its Delivery Mode flag from its reset state to its set state. The NSS 36 is arranged to respond to an incoming call having the above mentioned predetermined destination address and containing a companion unique code representative of unrestricted delivery mode to access the user profiles 68 in accordance with the source telephone number (calling line identity) retrieved from that incoming call, find the corresponding user profile and changes its Delivery Mode flag from its set state to its reset state. This latter message might be sent automatically by the mobile telephone when its battery is recharged, or when the user manually switches the mobile telephone from simplex operation to full operation.

In a first scenario, a calling user, also referred to as a caller, having a mobile telephone 10 originates a call and the NSS 36 responds to that originating call by accessing the user profile 68 associated with the called number, and ascertaining, inter alia, the state of the Delivery Mode flag.

If the Delivery Mode flag in that user profile is in its set state, the NSS 36 checks the user's preferences (in fields 72, 74 of the profile) and, if this service feature, i.e. receipt of a Short Message System (SMS) message whilst in "Message Only" Mode, has not been deselected by that called user, sends an announcement selection signal to the Voicemail system 62 for generating by the IVR 64 the selected announcement, "The number you have called is in Message Mode. You may speak a short message or key a text message.", and also sends to that calling mobile telephone 10 a first predetermined command signal.

The Short Message System technology is well known in the art and will not be described further.

The NSS 36 has also retrieved the caller's CLI and accesses the caller's profile to retrieve from an equipment identifier field 76 data indicative of the make and model of the telephone currently registered to the caller. The NSS 36 refers to a mapping table stored in the HLR 56, which maps that telephone to its menu structure type, and retrieves a type identifier. Using that type identifier, the NSS 36 now accesses the corresponding menu structure table, also stored in the HLR 56, in accordance with a Write Messages identifier to retrieve a numeric sequence command code, e.g. "23". The NSS 36 now constructs a command signal containing that sequence and a universal command code for commanding the control unit to enter its menu system, and sends it to the caller's telephone 10.

The control unit 26 in the caller's telephone 10 is arranged for direct control by such a received command signal, and responds to receipt of that command signal by automatically selecting the Write Messages submenu function of the Messages function. This converts the keypad 16 of the caller's mobile telephone 10 from numeric entry to alpha entry, in preparation for any text message that might be entered by the caller. It will be appreciated that the caller's telephone 10 has been commanded to enter its menu system; to select the Messages function, which for that particular telephone is in second position in the main menu; and to select the Write Messages function, which is in third position in the Messages submenu. This is known in the art as accessing a menu function by its shortcut, but the previously known use of the shortcut has been only by user input via the key pad of the telephone.

If the caller had been using a telephone having a different menu structure, the NSS 36 would have been directed by the mapping tables to the appropriate menu structure table, and would have constructed a corresponding command signal containing the universal command code and a different numeric sequence for entering the same Write Messages function.

Now that the caller's mobile telephone 10 has been automatically switched into Write Messages submenu function, the keypad is immediately available for the caller to use to create a text message. When he has finished creating the text message, he sends the message by selecting Options, and then Send. In a variant, the control unit 26 responds to the first key press by offering the Send function under a select soft key, so that when the caller has completed the message he sends it by means of a single press of the select soft key. In another variant, the control unit 26 the NSS 36 responds to the first key press by transmitting a code signal to the network indicating that the user has started to compose an SMS message, and the NSS 36 responds to this code signal by sending a further command signal to control the telephone to offer the Send function under the select soft key.

If the caller decides not to compose an SMS message but to speak a message instead, this is received by the IVR 64 and passed to the speech to text converter 66 to be converted into the appropriate format to be sent to the called number as an SMS message.

The NSS 36 receives the text message sent by the caller, or the text message output from the speech to text converter 66 should the caller not have availed himself of the immediate use of the Write Messages submenu function and spoken a message instead, and generates an SMS message and sends that to the called number.

In a second scenario, a user might have changed his network number for some reason, i.e. to a new network number from a previous network number. If a caller originates a call to the previous network number, the NSS 36 accesses the user profiles in the usual manner, and retrieves a profile, referred to as the "old" profile, corresponding to that previous network number. This profile will contain a pointer to another profile, referred to as the "new" profile, corresponding to that new network number. The NSS 36 now checks the "new" profile to see that there is no prohibition on the release of that new network number, e.g. that a Restricted Number flag 78 or a Number Withheld flag 80 is not in its set state, and connects the call to the new network number. The pointer to the "new" profile constitutes a predetermined indication of the present invention, and the corresponding condition is that the called user has a new network number.

The user's "old" profile will be deleted if the network administration re-allocates the old network number to another user. This prevents two profiles existing in respect of the same network number.

In a variant, instead of using "old" and "new" profiles, the profiles have a field for current network number, and a field for previous network number, and the profiles are accessed by matching either of these fields with the dialled number, since it will be appreciated that callers will dial either the old network number or the new network number. Where a profile has been retrieved on the basis of a match between the dialled number and the number in the previous network number field, the call is connected to the called user at the new network number, and the presence of that number in the previous network number field constitutes a predetermined indication of the present invention. The network administration deletes the content of the previous network number field if the old network number is re-allocated to another user, or after a fixed period of, say, one year.

In these circumstances, in addition to automatically routing that call to the new network number, the NSS 36 first accesses the mapping tables as described above in the first scenario to retrieve a numeric sequence corresponding to Number Entry, sends an announcement selection signal to the Voicemail system 62 for generating by the IVR 64 the selected announcement, "Your call is being connected. Please note that the called party has a new number which is being sent to you", and also generates and sends to that calling mobile telephone 10 a Phone Book Update command signal.

The Phone Book Update command signal contains the universal code for commanding the control unit 26 to enter its menu system, the numeric sequence "13", which selects the Phone Book function followed by the Add Entry submenu function, a second code for commanding a number entry part as opposed to a name entry part, and the new network number. In variants, the control unit 26 is arranged to select automatically the number entry part of the Add Entry submenu function in response to receipt of the Phone Book Update command signal, regardless of whether it contains that second code.

The control unit 26 does not immediately enter the Add Entry submenu function upon receipt of the Phone Book Update command signal, but performs a preliminary check to ascertain whether the original call had been made after selection from its Phone Book. If not, then it will provide a display for the entry of a number as part of the Add Entry submenu function and display in the text box of that display the new network number. If the caller wishes to add this number as a new entry to his Phone Book he presses a Navigator Key whose text is now reading "OK".

The control unit 26 responds to that manual command by sending a message to the GSM network 30 indicative of the caller's acceptance of the offer to add that new number to his Phone Book. In response, the NSS 36 sends a Add Entry command signal containing the name of the called party and a code for commanding control unit 26 to select the part of the Add Entry submenu function which displays a text box for the entry of a name, if it is not already doing so, and to display in the text box of that display the name of the called party. In a variant, the name of the called party is sent in the Phone Book Update command signal, and stored by the control unit 26 in readiness for use in this procedure.

If the caller wishes to add the offered name he presses a Navigator Key whose text is now reading "OK". Otherwise he can cancel the displayed name and enter his own text. Alternatively, he can accept the offered name and then edit it using the Edit submenu function of the Phone Book.

If the preliminary check ascertains that the original call had been made after selection from its Phone Book, the control unit 26 will know, by means of the Dialled Numbers submenu function of its Call Register function, the particular Phone Book entry, and instead of responding to the Phone Book Update command signal by switching to the Add Entry submenu function, now responds by entering the Edit submenu function of the Phone Book, automatically selecting that particular Phone Book entry and displaying the received new network number instead of the existing number of that particular Phone Book entry. The Navigator Key text will now read "OK", and the caller can accept the offered number by pressing the Navigator Key.

In a variation of this second scenario, the control unit is programmed to compare the CLI of an incoming call with the entries of the phone book (this is a known act for displaying the stored name of a matching entry) and if there is no matching entry it will send a request message to the network for a name associated with that CLI. This name can be the surname in the account details of the calling user, or it can be retrieved from a user-name field of the user's profile, if the calling user has previously supplied a name. This might be his preferred name, which might be a nickname or any other name different from the account surname.

When the called user ends the call, the control unit 26 now automatically selects the Add Entry function and enters the received data. This can be the number entry part first, followed by the name part, or the other way around. The called user can now choose to make a new entry in the same way as described above.

In a third scenario, when the NSS 36 delivers an SMS message for a called user, it also sends a Write Messages command signal so as to anticipate that the called user will wish to respond by composing a reply message via the key pad. The NSS 36 will have retrieved the called user's equipment type identifier from his profile, referred to the mapping to find the menu structure type, and generated the command signal comprising the appropriate shortcut numeric sequence.

In a fourth scenario, the network is arranged for delivery of e-mail messages to a called user's mobile telephone, and when it sends such an e-mail message it also sends an appropriate command signal, generated in the same manner as for the third scenario, so as to anticipate that the called user will wish to respond by composing a reply e-mail message via the key pad. This command signal selects a Write E-mail function of the function menu.

Whereas in the above described embodiment the network 30 is a GSM network, it will be appreciated that this is not a limiting factor of the present invention and that the network 30 could equally well be a General Packet Radio Service (GPRS) network.

Whereas in the above described embodiment the control messages from the mobile telephone sent to the above mentioned predetermined telephone number are received directly by the NSS 36 and handled by the profile management program forming part of the control programs of the NSS 36, this profile management program managing the fields of the user's profile, e.g. changing the state of flags, entering addresses and numbers, and changing or deleting them, in a variant the control messages are received at the operation and maintenance centre 52, and the management of the profile in the NSS 36 is performed remotely by control programs in the operation and maintenance centre 52, or manually by network operations personnel at the operation and maintenance centre 52 if the user communicates his intentions for profile change otherwise than by the control messages sent from his mobile telephone.

Whereas in the above mentioned variant, the NSS 36 retrieves a stored menu function identifier from a field 82 associated with SMS messages, and sends a menu function command signal in association with the SMS message, in a further variant the menu function command signal is incorporated within a modified alert command message transmitted to the called user's mobile telephone to trigger its internal ringer. In this case, the mobile telephone simultaneously rings and auto-configures in accordance with the menu function command, ready for the called user to respond. The modified alert command message might include other additional information for use by the called user's mobile telephone for control of its operation or for display.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of operating a communications network having a user profile store, the method comprising the steps of:
    retrieving a dialled destination network number from signalling data of a call from a calling user to a called user;
    accessing the user profile store in accordance with that retrieved dialled destination number to retrieve a corresponding user profile; and
    if the retrieved user profile contains a predetermined indication indicative of a corresponding condition associated with that called user, sending to the calling user a command for causing a telephone associated with the calling user to enter a predetermined menu function associated with that condition;
    wherein said condition is that a telephone associated with that called user has sent a restricted delivery mode message to the network, and wherein said predetermined menu function is a write text messages function.

2. A method as claimed in claim 1, wherein said command is generated in accordance with menu structure data retrieved from storage in accordance with a calling line identity retrieved from said signalling data.

3. A method as claimed in claim 2, wherein user profiles contain an identifier for telephone equipment currently registered to the user, and said menu structure data is retrieved from a mapping of menu structure data against equipment identifier by accessing that mapping in accordance with an identifier retrieved from the calling user's profile.

4. A method as claimed in claim 3, wherein said command comprises a number sequence corresponding to a menu shortcut for said predetermined menu function.

5. A method of operating a communications network having a user profile store, the method comprising the steps of:
    retrieving a dialled destination network number from signalling data of a call from a calling user to a called user;
    accessing the user profile store in accordance with that retrieved dialled destination number to retrieve a corresponding user profile; and
    if the retrieved user profile contains a predetermined indication indicative of a corresponding condition associated with that called user, sending to the calling user a command for causing a telephone associated with the calling user to enter a predetermined menu function associated with that condition, wherein said condition is that a telephone associated with that called user has sent a restricted delivery mode message to the network, and wherein said predetermined menu function is a write messages function; and
    receiving at the network from that calling user message data in text form, and in response sending a message to the called user.

6. A method as in claim 5,
    wherein said condition is updated based on information provided by or through a telephone associated with the called user.

7. The method as in claim 5, wherein the restricted delivery mode message sent from the telephone associated with that called user to the network is indicative of a low battery condition of the telephone associated with that called user.

8. The method as in claim 5, wherein the restricted delivery mode message sent from the telephone associated with that called user to the network is indicative of a user-selected message-only mode selected on the telephone associated with that called user.

9. A method of operating a communications network having a user profile store, the method comprising the steps of:
    retrieving a dialled destination network number from signalling data of a call from a calling user to a called user;
    accessing the user profile store in accordance with that retrieved dialled destination number to retrieve a corresponding user profile; and
    if the retrieved user profile contains a predetermined indication indicative of a corresponding condition associated with that called user, sending to the calling user a command for causing a telephone associated with the calling user to enter a predetermined menu function associated with that condition;
    wherein said condition is that the called user is currently associated with a network number that is different from the network number that he was previously associated with, wherein the command contains the called user's current network number and also causes the telephone associated with the calling user to display that current network number, and wherein said predetermined menu function is a telephone directory function; and
    the call from the calling user was made by entering the destination number via a keypad, and wherein said predetermined menu function is an add entry function of the telephone directory function.

10. A method as claimed in claim 9, wherein the network also sends to the telephone associated with the calling user data indicative of the name of the called user for use by the calling user in adding an entry to the telephone directory.

11. A method as claimed in claim 10, wherein the network sends the name of the called user in said command.

12. A method as claimed in claim 10, wherein the network sends the name of the called user in a separate command in response to an acceptance signal sent from the telephone associated with the calling user and indicating that the calling user had activated the add entry function.

13. A communications network having a user profile store, and being arranged:
  to retrieve a dialled destination number from signalling data of a call from a calling user to a called user;
  to access the user profile store in accordance with that retrieved dialled destination number to retrieve a corresponding user profile;
  if the retrieved user profile contains a predetermined indication indicative of a corresponding condition associated with that called user, to send to the calling user a command for causing a telephone associated with the calling user to enter a predetermined menu function associated with that condition; and
  to respond to a said predetermined indication indicative that a telephone associated with that called user has sent a restricted delivery mode message to the network by generating said command such as to cause the telephone associated with the calling user to enter a write messages function.

14. A network as claimed in claim 13, arranged to receive from that calling user message data in text form, and to respond by sending a message to the called user.

15. A network as claimed in claim 13, and arranged to generate said command in accordance with menu structure data retrieved from storage in accordance with a calling line identity retrieved from said signalling data.

16. A network as claimed in claim 15, comprising a mapping of menu structure data against equipment identifier, and having user profiles containing an identifier for telephone equipment currently registered to the user, and being arranged to retrieve menu structure data by accessing that mapping in accordance with an identifier retrieved from the calling user's profile.

17. A network as claimed in claim 16, and arranged to include in said command a number sequence corresponding to a menu shortcut for said predetermined menu function.

18. A communications network as in claim 13 wherein said condition is updated based on information provided by or through a telephone associated with the called user.

19. The network as in claim 13, wherein the restricted delivery mode message sent from the telephone associated with that called user to the network is indicative of a low battery condition of the telephone associated with that called user.

20. The network as in claim 13, wherein the restricted delivery mode message sent from the telephone associated with that called user to the network is indicative of a user-selected message-only mode selected on the telephone associated with that called user.

21. A communications network having a user profile store, and being arranged:
  to retrieve a dialled destination number from signalling data of a call from a calling user to a called user:
  to access the user profile store in accordance with that retrieved dialled destination number to retrieve a corresponding user profile:
  if the retrieved user profile contains a predetermined indication indicative of a corresponding condition associated with that called user, to send to the calling user a command for causing a telephone associated with the calling user to enter a predetermined menu function associated with that condition;
  to respond to a said predetermined indication indicative of the dialled destination number being a non-current current destination number associated with that called user to generate said command such as to include the called user's current destination number and also such as to cause the telephone associated with the calling user to enter a telephone directory function and to display that current destination number;
  to send to the calling user the name of the called user for use by the calling user in adding an entry to the telephone directory.

22. A network as claimed in claim 21, and further arranged to send the name of the called user by including it in said command.

23. A network as claimed in claim 21, and further arranged to respond to receipt of an acceptance signal sent from the telephone associated with the calling user and indicating that the calling user had activated an add entry function to send the name of the called user in a separate command.

* * * * *